United States Patent
Schultz et al.

(10) Patent No.: US 9,140,504 B1
(45) Date of Patent: Sep. 22, 2015

(54) PERFORMANCE TESTING APPARATUS FOR MICROCLIMATE COOLING UNIT

(71) Applicants: Andrew Schultz, Grosse Pointe Farms, MI (US); Adam Blot, Schenectady, NY (US); Matthew Marsh, Green Island, NY (US); David Cassidy, Watervliet, NY (US); Victor E. Nerses, Voorheesville, NY (US)

(72) Inventors: Andrew Schultz, Grosse Pointe Farms, MI (US); Adam Blot, Schenectady, NY (US); Matthew Marsh, Green Island, NY (US); David Cassidy, Watervliet, NY (US); Victor E. Nerses, Voorheesville, NY (US)

(73) Assignee: The United States of America as Represented by the Secretary of the Army, Washington, DC (US)

(*) Notice: Subject to any disclaimer, the term of this patent is extended or adjusted under 35 U.S.C. 154(b) by 120 days.

(21) Appl. No.: 13/748,776

(22) Filed: Jan. 24, 2013

Related U.S. Application Data

(60) Provisional application No. 61/593,913, filed on Feb. 2, 2012.

(51) Int. Cl.
*G01K 7/00* (2006.01)
*G01K 1/00* (2006.01)
*F28F 27/00* (2006.01)

(52) U.S. Cl.
CPC ................................... *F28F 27/00* (2013.01)

(58) Field of Classification Search
USPC .......................... 374/179, 141, 208, 166, 112
See application file for complete search history.

(56) References Cited

U.S. PATENT DOCUMENTS

| | | | |
|---|---|---|---|
| 3,479,872 A * | 11/1969 | Tauson | 374/31 |
| 4,448,545 A * | 5/1984 | Pelka et al. | 374/41 |
| 4,846,584 A * | 7/1989 | Burch et al. | 374/31 |
| 5,154,513 A * | 10/1992 | Beer | 374/147 |
| 5,992,505 A * | 11/1999 | Moon | 165/11.1 |
| 7,481,574 B2 * | 1/2009 | Ariyoshi | 374/11 |
| 2011/0035186 A1 * | 2/2011 | Liu et al. | 702/182 |
| 2011/0286493 A1 * | 11/2011 | Torniainen et al. | 374/33 |
| 2014/0177670 A1 * | 6/2014 | Gameiro et al. | 374/100 |

* cited by examiner

*Primary Examiner* — Mirellys Jagan
(74) *Attorney, Agent, or Firm* — Henry S. Goldfine

(57) ABSTRACT

A testing apparatus measures cooling power of an electrically-powered Microclimate Cooling Unit (MCU) at the point of use of the MCU. The tester includes fluid supply and return ports for fluidly connecting to the MCU. A fluid heater provides a heat load to fluid in the tester. Fluid temperatures upstream and downstream of the heater are measured. The fluid flow rate is adjustable and measurable. A digital processor extracts the temperature and fluid flow rate data and computes cooling watts. The computed cooling watts are compared to the manufacturer's specifications to determine if the MCU is operating properly.

9 Claims, 3 Drawing Sheets

PERFORMANCE TESTING APPARATUS FOR MICROCLIMATE COOLING UNIT

CROSS-REFERENCE TO RELATED APPLICATIONS

The present application claims the benefit of priority of U.S. provisional patent application Ser. No. 61/593,913 filed on Feb. 2, 2012, which is incorporated by reference herein.

STATEMENT OF GOVERNMENT INTEREST

The inventions described herein may be manufactured, used and licensed by or for the United States Government.

BACKGROUND OF THE INVENTION

The invention relates in general to cooling systems and in particular to apparatus and methods for evaluating the performance of cooling systems.

Cooling systems help prevent heat stress in humans exposed to extreme climates or work environments. A personal cooling system enables chilled fluid to circulate through tubing placed in garments worn by a person. In some personal cooling systems, the tubing on the person is tethered or connected to heavier components (for example, heat exchangers) that cool the fluid in the tubing. Thus, the heavier components, including power supplies and compressors, are not carried by the person being cooled. Vehicle-mounted personal cooling systems may be mounted in a vehicle, such as an air or ground vehicle, and connected to a person or persons in the vehicle via the fluid tubing. A Microclimate Cooling Unit (MCU) mounted in a vehicle may be used to chill fluid that provides cooling to a vehicle's crew via tubing in garments worn by the crew.

The performance of an MCU can degrade because of normal wear and tear, physical damage, or excessive use. A performance-degraded MCU uses more power and cools less than an MCU that is operating at standard or normal efficiency. In some environments, loss of cooling results causes only personal discomfort. However, in very high temperature environments, such as compartments of armored vehicles deployed in a desert and containing many heat-producing electronic devices, the loss of cooling in the compartment can result in severe heat sickness. Heat sickness adversely affects humans' decision-making abilities, which are critical to survival when engaged with hostile parties or when operating an air or land vehicle.

There exists no simple way to accurately test the performance of an MCU at its point of use. MCUs may be as small as about 6 inches by 6 inches by 14 inches with little space in the interior to access any of the refrigeration components for testing purposes. Also, the MCU housings are not easily opened at the point of use.

An MCU can be shipped from its point of use to another location, such as the manufacturer's facility, for testing with a laboratory testing system. The heat load used to test an MCU in a laboratory test system is generally a multi-gallon capacity heated water reservoir. The manufacturer's testing system is accurate, although it is not portable. The size and weight of the water reservoir and the power need to heat the water in the reservoir preclude ease of portability. So, the MCU must be shipped from its point of use to the laboratory testing system. This process is expensive and time-consuming because all MCUs, whether performance-degraded or not, must be sent to the manufacturer for testing.

An onsite temperature differential test can be used to provide some indication of MCU performance. The temperature differential test includes measuring surface temperature at two locations on a bottom surface of the MCU, using a hand-held infrared temperature sensor. If the difference in temperature between the two locations is greater than 10 degrees F., then the MCU is considered to be performing adequately. While better than no test at all, the temperature differential test does not provide a very accurate indication of the actual cooling performance of an MCU. No heat load is applied to the MCU using the temperature differential test. Thus, properly-performing MCUs may be misdiagnosed as performance-degraded and shipped away for further testing, and performance-degraded MCUs may be misdiagnosed as properly-performing and not shipped for further testing.

In the case of the U.S. Army, over 7,000 MCUs have been deployed in Army aviation and ground vehicles. It is costly and time-consuming to ship this large number of MCUs from their respective points of use to suitable locations for performance testing. A need exists for a more accurate performance testing apparatus that can be used at the point of use of an MCU.

SUMMARY OF INVENTION

One aspect of the invention is an apparatus for measuring cooling power of an electrically-powered Microclimate Cooling Unit (MCU) at a point of use of the MCU. The apparatus includes a fluid supply port connected to a fluid conduit and a flow rate controller disposed in the fluid conduit. The flow rate controller includes an analog flow meter. A fluid heater heats fluid in the fluid conduit downstream of the fluid supply port. A first thermocouple measures supply fluid temperature in the fluid conduit downstream of the fluid supply port and upstream of the fluid heater. A digital flow meter is disposed in the fluid conduit. A fluid return port is connected to the fluid conduit downstream of the fluid heater. A second thermocouple measures return fluid temperature in the fluid conduit downstream of the fluid heater and upstream of the fluid return port.

A power supply is connected to the fluid heater via a relay. At least one cooling fan is connected to the power supply. A housing contains the fluid conduit, the flow rate controller, the first and second thermocouples, the fluid heater, the relay, the digital flow meter, the power supply and the at least one cooling fan. The housing includes an exterior. The exterior has mounted thereon: a) visual displays of the supply temperature measured by the first thermocouple, the return temperature measured by the second thermocouple, and flow rates measured by the digital flow meter; b) a return temperature controller that is connected to the relay; c) the flow rate controller and analog flow meter; d) the fluid supply port and the fluid return port; e) power switches for the fluid heater, the apparatus for measuring cooling power, and the MCU; f) a power supply connection for the MCU; g) a control cable connection for the MCU; and h) a controller for the MCU.

A computer extracts the temperatures measured by the first and the second thermocouples and the flow rates measured by the digital flow meter and computes cooling power in real-time. In one embodiment, the computer is disposed inside the housing and the apparatus includes a visual display of the cooling power, located on the exterior of the housing.

In another embodiment, the computer is disposed external to the housing and the apparatus includes a data acquisition hub on the exterior of the housing. The data acquisition hub and the computer may be connected by a cable. The computer extracts real-time values of the temperatures measured by the first and second thermocouples and flow rates measured by the digital flow meter.

Another aspect of the invention is a method that includes providing an apparatus for measuring cooling power of an electrically-powered Microclimate Cooling Unit (MCU). The MCU is mounted in a vehicle and the point of use of the MCU is in the vehicle. The method includes measuring cooling power of the MCU at the MCU point of use.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION

Figure 1:
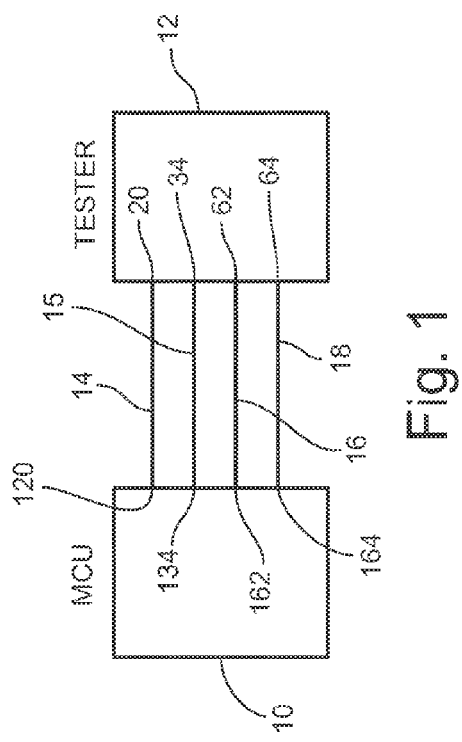
FIG. 1 is a schematic drawing of an MCU and an MCU tester.

FIG. 1 is a schematic drawing of one embodiment of an electrically-powered Microclimate Cooling Unit (MCU) 10 and one embodiment of an MCU cooling performance testing apparatus or tester 12. Suitable MCUs 10 are available from, for example, Cobham Life Support, 10 Cobham Drive, Orchard Park, N.Y., USA, 14127.

Figure 6B:
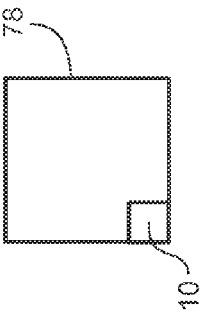
FIG. 6B is a schematic drawing of an air vehicle with an MCU mounted therein.
Figure 6A:
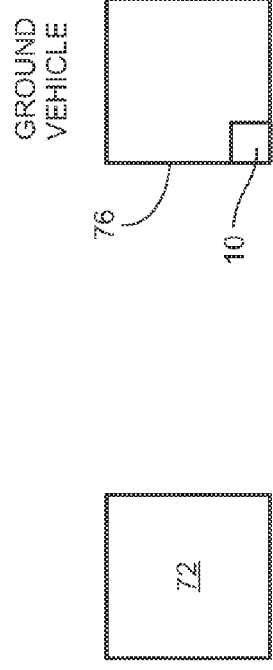
FIG. 6A is a schematic drawing of a ground vehicle with an MCU mounted therein.

MCU 10 is typically mounted in a vehicle, such as an air or ground vehicle. FIG. 6A is a schematic drawing of a ground vehicle 76 with an MCU 10 mounted therein. FIG. 6B is a schematic drawing of an air vehicle 78 with an MCU 10 mounted therein. Tester 12 is used to determine the cooling power of MCU 10. For testing purposes, tester 12 is connected to MCU 10 via a fluid supply connection 14, a fluid return connection 15, an electrical power cable 16, and a control cable 18. Importantly, tester 12 is able to test MCU 10 at the point of use of the MCU 10.

Fluid cooled by MCU 10 is supplied to tester 12 via fluid supply connection 14. Fluid heated by tester 12 is returned to MCU 10 via fluid return connection 15. Fluid connections 14 and 15 may be, for example, insulated hoses. A fluid reservoir (not shown) with a capacity on the order of a pint may be interposed between MCU 10 and tester 12 in either the fluid supply connection 14 or the fluid return connection 15 as a means to purge air from the fluid system. The method of using such a reservoir to purge air is known. Tester 12 supplies power to MCU 10 via power cable 16. Tester 12 controls the cooling output of MCU 10 via control cable 18.

Figure 2:
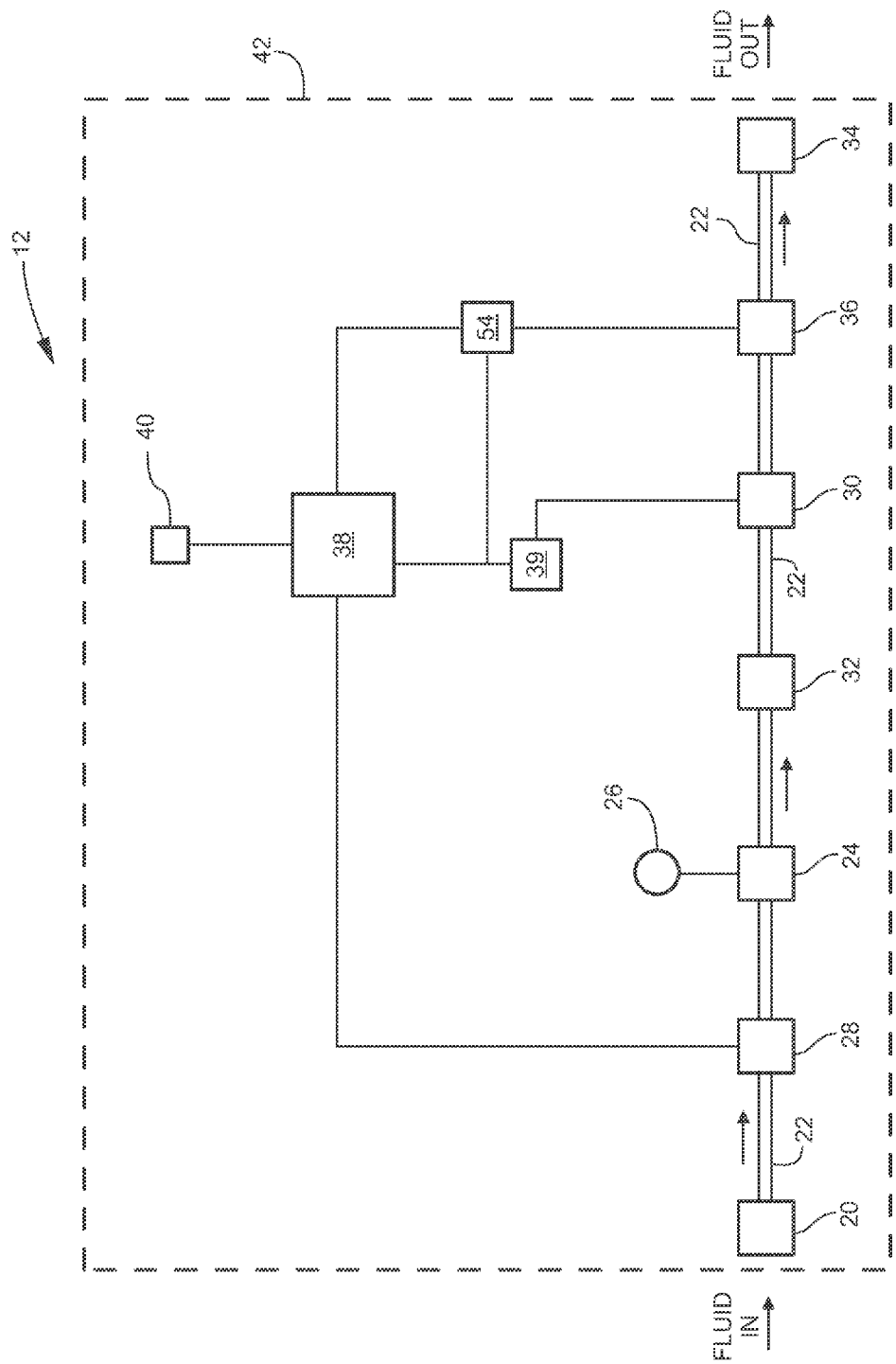
FIG. 2 is a schematic drawing of one embodiment of an MCU tester.

FIG. 2 is a schematic drawing of one embodiment of MCU tester 12. Tester 12 includes a fluid supply port 20 connected to a fluid conduit 22. A flow rate controller 24 and an analog flow meter 26 are disposed downstream of fluid supply port 20. A fluid heater 30 heats fluid in fluid conduit 22 downstream of fluid supply port 20. A thermocouple 28 measures fluid temperature in fluid conduit 22 downstream of fluid supply port 20 and upstream of fluid heater 30. A power supply 38 supplies power to fluid heater 30 via a relay 39. At least one cooling fan 40 is powered by power supply 38. A digital flow meter 32 is disposed in fluid conduit 22. A fluid return port 34 is connected to fluid conduit 22 downstream of fluid heater 30. A thermocouple 36 measures fluid temperature in fluid conduit 22 downstream of fluid heater 30 and upstream of fluid return port 34.

Figure 3:
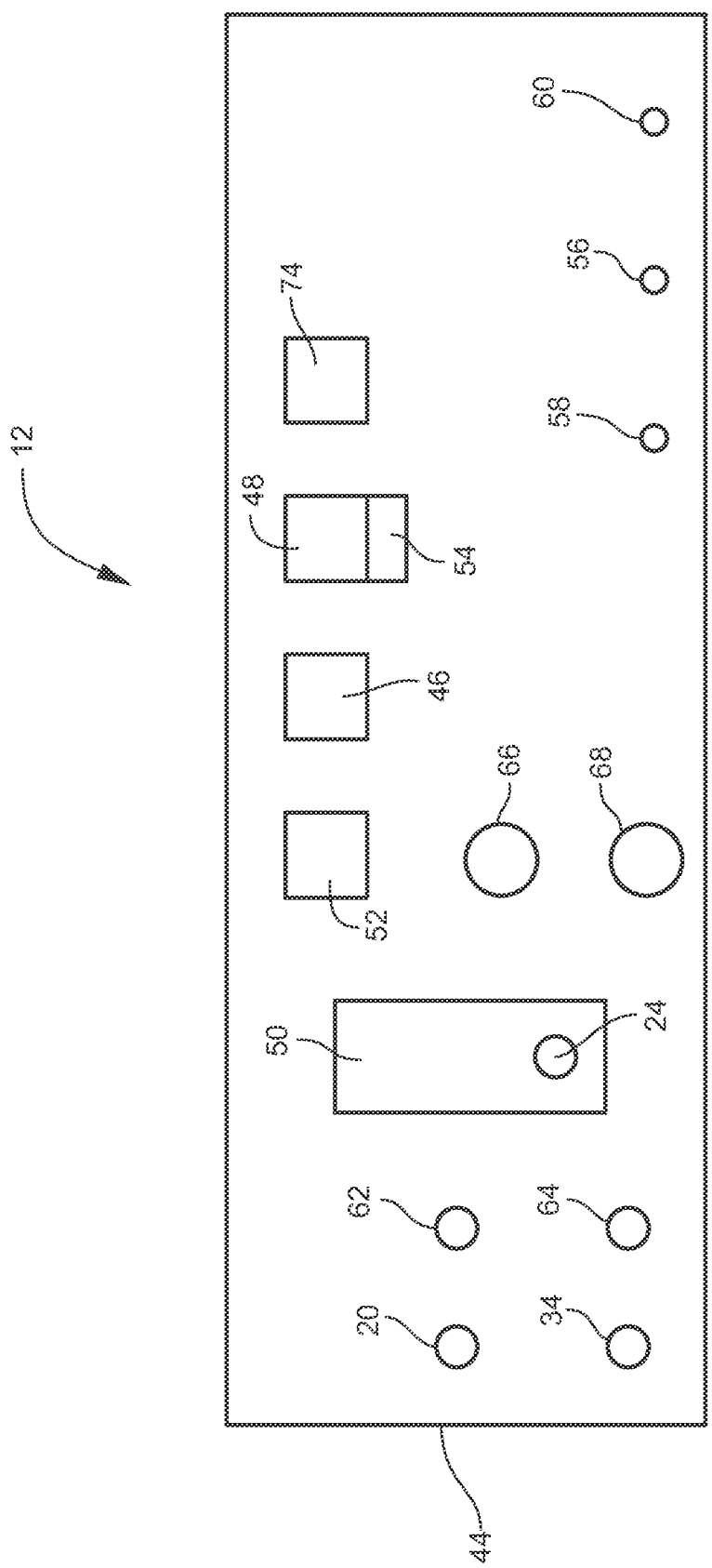
FIG. 3 is a schematic drawing of an exterior of a housing for an MCU tester.

A housing 42 contains fluid conduit 22, flow rate controller 24, thermocouples 28 and 36, fluid heater 30, digital flow meter 32, power supply 38, and cooling fan 40. Preferably, two fans 40 may be used, an intake fan and an exhaust fan. Housing 42 may be made of a metal and may include a removable lid for easy access to the interior of housing 42. Housing 42 includes an exterior 44 (FIG. 3). Exterior 44 may include front and side panels. For ease of use, exterior 44 includes fluid and electrical connections for connecting tester 12 to MCU 10. A variety of visual displays and controls are also located on exterior 44. Preferably, the connections, visual displays and controls are located on a front panel of exterior 44.

Referring to FIG. 3, exterior 44 has mounted thereon a visual display 46 of the supply temperature measured by thermocouple 28, a visual display 48 of the return temperature measured by thermocouple 36, a visual display 50 for analog flow meter 26, and a visual display 52 for digital flow meter 32. Fluid supply port 20 and fluid return port 34 are mounted on exterior 44. Controls on exterior 44 include flow rate controller 24, a power switch 56 for fluid heater 30, a power switch 58 for tester 12, a power switch 60 for MCU 10, and a controller 66 for controlling the cooling output of MCU 10. Electrical connections on exterior 44 include a control cable connection 64 for connecting control cable 18 to MCU 10 and a power supply connection 62 for connecting power cable 16 to MCU 10. A data output port 68 on exterior 44 enables temperature and flow data to be extracted from tester 12. Visual displays 46, 48, and 52 may be, for example, liquid crystal displays.

Supply fluid connection 14 (FIG. 1), such as a hose, is connected between fluid supply port 20 on tester 12 and a fluid supply port 120 on MCU 10. Return fluid connection 15 (FIG. 1), such as a hose, is connected between fluid return port 34 on tester 12 and a return port 134 on MCU 10. Control cable 18 (FIG. 1), such as a wiring harness, is connected between control cable connector 64 on tester 12 and a control connector 164 on MCU 10. Control signals from controller 66 on tester 12 are sent via control cable 18 to MCU 10 to vary the cooling output of MCU 10. Electric power cable 16 (FIG. 1), such as a wiring harness, is connected between power supply connector 62 on tester 12 and a power connector 162 on MCU 10. Connector 62 is also connected to power supply 38. Tester 12 supplies power to MCU 10 during performance testing of MCU 10.

Flow rate controller 24 may include a knob to adjust the flow in fluid conduit 22. Some performance testing may require a specific flow rate in conduit 22. The flow rate may be viewed on analog flow meter display 50. Controller 66, for example, a knob, controls the cooling output of MCU 10 via control cable 18. Data output port 68, such as a USB connection or USB data acquisition hub, enables digital output of real-time values of the temperatures measured by thermocouples 28 and 36 and the flow rate measured by digital flow meter 32.

Figure 4:
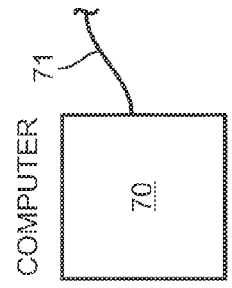
FIG. 4 is a schematic drawing of a computer.

In one embodiment, a portable computer 70 (FIG. 4), for example, a notebook or laptop computer, may be connected via cable 71 to data output port 68 to extract and record the temperature and flow rate values. Computer 70 may calculate the cooling power of MCU 10 using known algorithms. The known algorithms calculate cooling power (watts) from the temperatures measured by thermocouples 28 and 36 and the flow rate measured by digital flow meter 32. The calculated cooling power is then compared to the manufacturer's specifications to determine if the MCU 10 is cooling properly.

Figure 5:
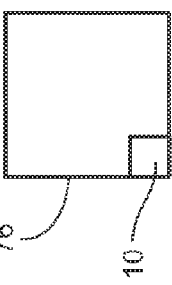
FIG. 5 is a schematic drawing of a microprocessor.

In another embodiment, tester 12 may include an internal computer such as a microprocessor 72 (FIG. 5) disposed inside of housing 42. Microprocessor 72 may extract and record the temperature and flow rate values, perform the cooling power calculations, and display the calculated cooling watts visually on a display 74 on exterior 44. Microprocessor 72 may include memory to store the temperature, flow rate, and cooling watts data. Data output port 68 may be used to access the information in the memory. Computer 70 may not be needed if microprocessor 72 is used.

To test the cooling performance of MCU 10, power supply 38 of tester 12 is connected to an external power supply, for example, a 115 volt AC power outlet. Fluid return port 34 of tester 12 is connected via return connection (hose) 15 to return port 134 on MCU 10. Supply connection (hose) 14 is connected to supply port 120 on MCU 10 and to fluid supply port 20 on tester 12. Preferably, a small fluid reservoir (not shown) is interposed in a known manner in return or supply fluid connection 15 or 14 to allow air to escape from the fluid system.

Control cable or harness 18 is connected to control connection 64 on tester 12 and to control connection 164 on MCU 10. Power cable 16 is connected between power connection 62 on tester 12 and power connection 162 on MCU 10. Computer 70 (if used) is connected to data output port 68. Main power switch 58 is moved to the on position and then MCU power switch 62 is moved to the on position. MCU controller 66 is moved to the maximum cooling position. The fluid in fluid conduit 22 is cooled by MCU 10 until the supply temperature measured by thermocouple 28 is the same as the return temperature measured by thermocouple 36. This may take about 30 seconds.

Next, power to heater 30 is enabled using power switch 56. Incorporated with or separate from return temperature display 48 is a return temperature control 54 for setting a desired return temperature at thermocouple 36. Control 54 is connected to a relay 39 that is connected to power supply 38. Relay 39 enables power to heater 30 as needed. Use of relay 39 enables the use of a smaller and less massive power supply 38. Power to heater 30 may be, for example, 110 volt AC power. The fluid temperature in fluid conduit 22 will increase until the return temperature at thermocouple 36 is the temperature set by temperature control 54. In some embodiments, the set temperature is about 80 degrees F.

Once the supply temperature at thermocouple 28 is stable, the temperatures at thermocouples 28 and 36 and the flow rate at digital flow meter 32 may be used to calculate the cooling power of MCU 10. The cooling power of MCU 10 may be calculated by external computer 70 or internal microprocessor 72. The calculated cooling power is then compared to the manufacturer's specifications to determine if the MTU 10 should be shipped from the point of use for repair or replacement.

Preferably, tester 12 weighs less than fifty pounds. More preferably, tester 12 weighs no more than thirty-one pounds. As defined by the U.S. Dept. of Defense, a "man portable" device weighs no more than thirty-one pounds. The man portable embodiment uses microprocessor 72 disposed in the interior of housing 42.

While the invention has been described with reference to certain embodiments, numerous changes, alterations and modifications to the described embodiments are possible without departing from the spirit and scope of the invention as defined in the appended claims, and equivalents thereof.

What is claimed is:

1. An apparatus for measuring cooling power of an electrically-powered Microclimate Cooling Unit (MCU) at a point of use of the MCU, comprising:
  a fluid supply port connected to a fluid conduit;
  a flow rate controller disposed in the fluid conduit, the flow rate controller including an analog flow meter;
  a fluid heater that heats fluid in the fluid conduit downstream of the fluid supply port;
  a first thermocouple that measures supply fluid temperature in the fluid conduit downstream of the fluid supply port and upstream of the fluid heater;
  a digital flow meter disposed in the fluid conduit;
  a fluid return port connected to the fluid conduit downstream of the fluid heater;
  a second thermocouple that measures return fluid temperature in the fluid conduit downstream of the fluid heater and upstream of the fluid return port;
  a power supply connected to the fluid heater via a relay;
  at least one cooling fan connected to the power supply;
  a housing that contains the fluid conduit, the flow rate controller, the first and second thermocouples, the fluid heater, the relay, the digital flow meter, the power supply and the at least one cooling fan, the housing including an exterior, the exterior having mounted thereon
    a) visual displays of the supply temperature measured by the first thermocouple, the return temperature measured by the second thermocouple, and flow rates measured by the digital flow meter,
    b) a return temperature controller that is connected to the relay,
    c) the flow rate controller and analog flow meter,
    d) the fluid supply port and the fluid return port,
    e) power switches for the fluid heater, the apparatus for measuring cooling power, and the MCU,
    f) a power supply connection for the MCU, the power supply connection being connected to the power supply;
    g) a control cable connection for the MCU, and
    h) a controller for the MCU; and
  a computer that extracts the temperatures measured by the first and the second thermocouples and the flow rates measured by the digital flow meter and computes cooling power in real-time.

2. The apparatus of claim 1, wherein the computer is disposed external to the housing, the apparatus further comprising a data acquisitior hub on the exterior of the housing for outputting real-time values of the temperatures measured by the first and second thermocouples and flow rates measured by the digital flow meter, the computer being connected to the data acquisition hub with a cable.

3. The apparatus of claim 1, wherein a weight of the apparatus is less than fifty pounds.

4. The apparatus of claim 1, wherein the computer is disposed inside the housing, the apparatus further comprising a visual display of the cooling power located on the exterior of the housing.

5. The apparatus of claim 2, wherein the visual display of the cooling power is in watts.

6. The apparatus of claim 2, wherein a weight of the apparatus is no more than about thirty-one pounds.

7. A method, comprising:
providing the apparatus of claim 1 wherein the MCU is mounted in a vehicle and the point of use is in the vehicle; and
measuring cooling power of the MCU at the MCU point of use.

8. The method of claim 7, wherein the vehicle is a ground vehicle.

9. The method of claim 7, wherein the vehicle is an air vehicle.

\* \* \* \* \*